Dec. 23, 1952     O. H. CRAM     2,622,630
LUBRICATING DEVICE FOR LOOMS
Filed Oct. 11, 1950     2 SHEETS—SHEET 1
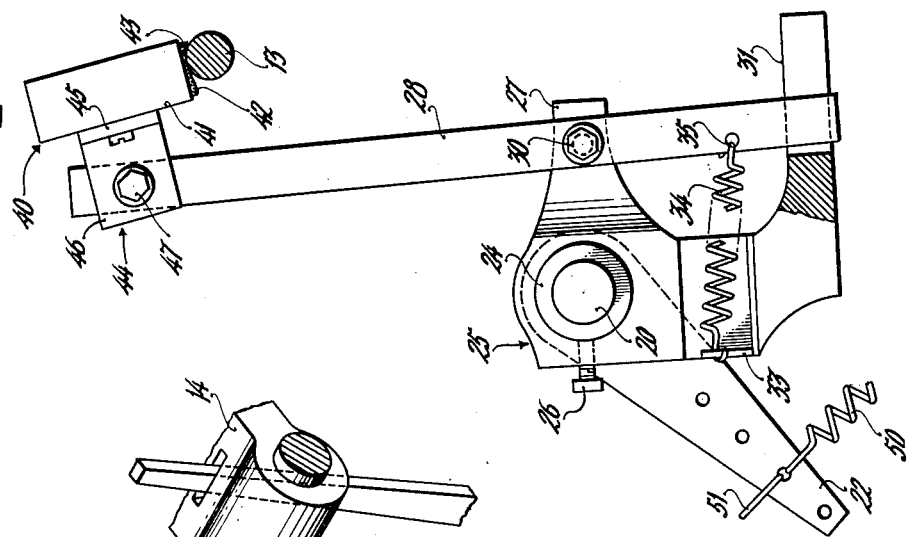
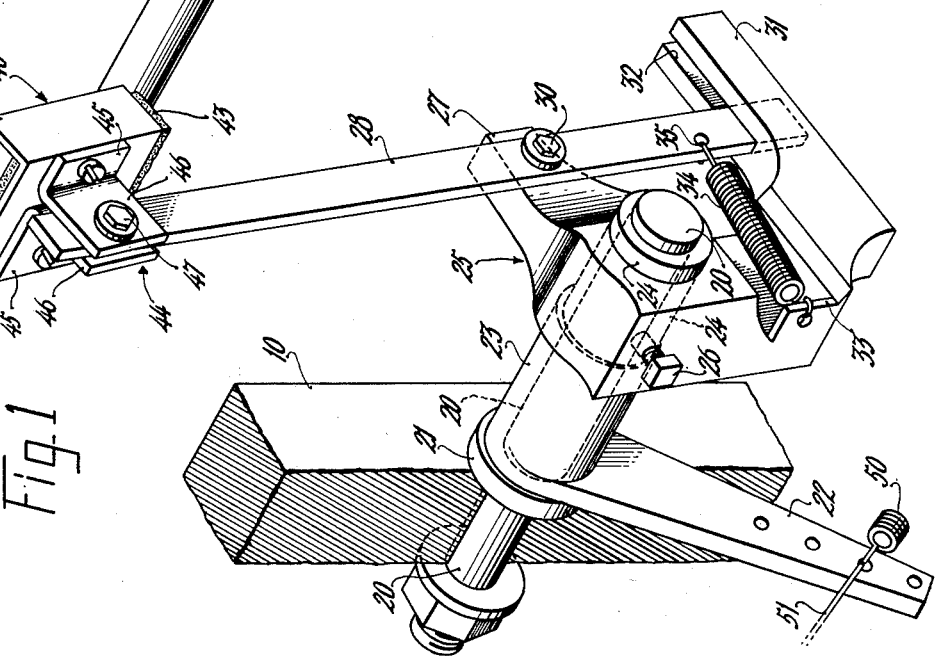
INVENTOR.
OZRO H. CRAM
BY
Jesse A. Holton
ATTORNEY

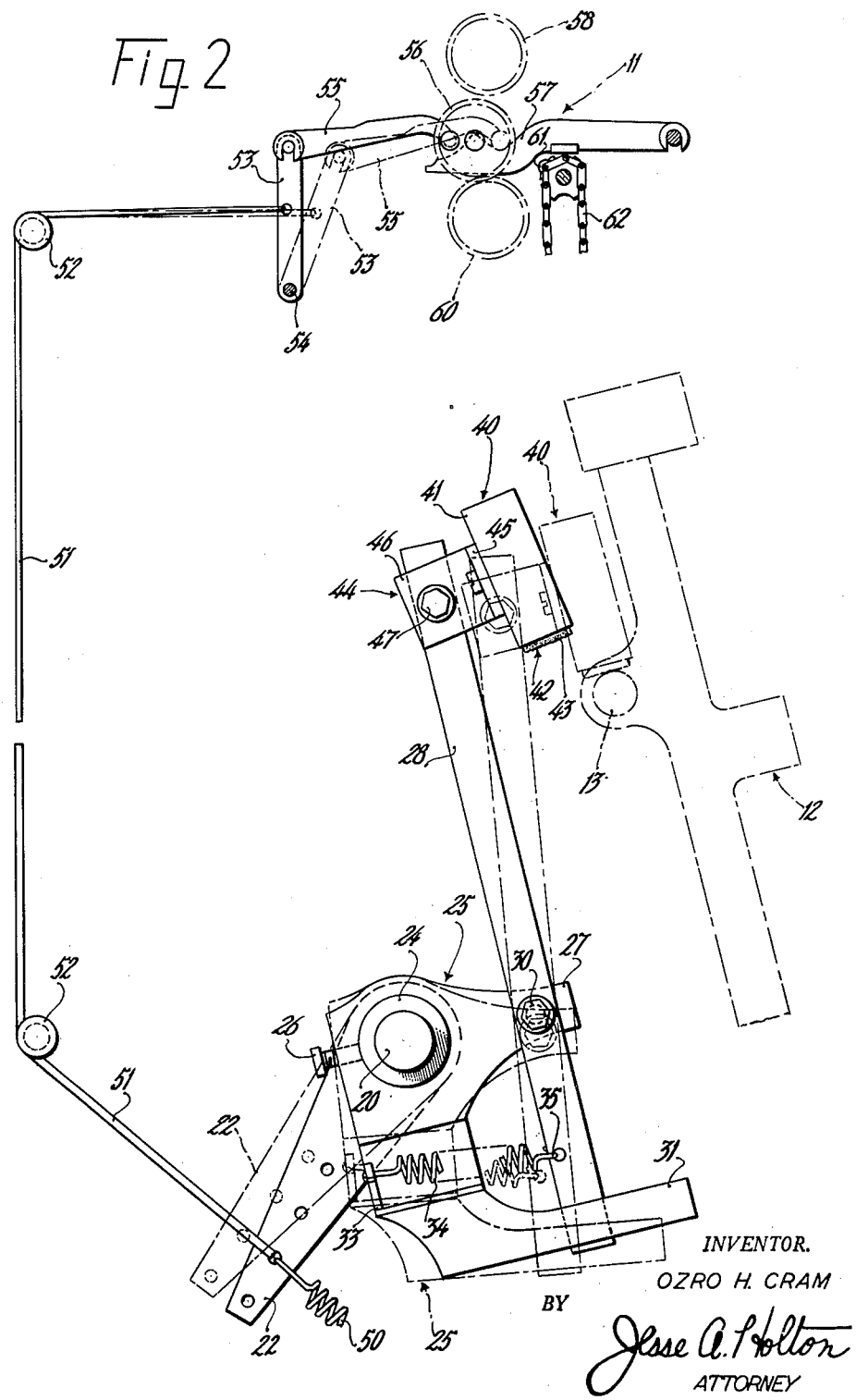

Patented Dec. 23, 1952

2,622,630

UNITED STATES PATENT OFFICE 2,622,630

LUBRICATING DEVICE FOR LOOMS

Ozro H. Cram, Sanford, Maine

Application October 11, 1950, Serial No. 189,510

15 Claims. (Cl. 139—158)

1

This invention relates to lubricating devices for looms and particularly for the picker spindles of looms, and their associated pickers.

Prior attempts to devise an oiler for picker spindles have brought on dissatisfaction for a number of reasons. It has been conceived, previously, to mount an oil wick at the rear of the picker spindle and contact the side of the spindle by the rearward movement of the lay. Such devices must apply the lubricant at each rearward movement of the lay resulting in too frequent application with consequent excess of oil, and purely haphazard oil supply because of vibration of the heavy mass of the lay and associated mechanism against the wick; and, also, imperfect distribution of the lubricant because applied at the side or bottom of the spindle. Other attempts have been unsatisfactory because of the excessive expense of the apparatus and its installation, particularly those attempts which have involved injector apparatus and sought to force oil through a bore in the picker spindle and out through a vent at a point between the spindle and its picker. Additionally such latter devices require considerable attention of the operator and there is no satisfactory control of the oil supplied.

The present invention, therefore, has for one of its objects to provide an extremely simple, low cost, yet reliably effective device for supplying lubricant in controlled quantity to a picker spindle of a loom; the supply being under such precise regulation that the spindle and its associated picker are kept free and relatively cool during the operation of the loom yet the lubricant is not furnished in any excess which may spread to other parts and eventually to the cloth where spoilage could occur.

Another object of the invention is to provide a device employing a saturated wick or stick of lubricant which is adapted to be automatically advanced periodically from a position which is clear of the travel of any of the picker mechanism to a position of brief yielding pressure contact with the upper part of the picker spindle and then quickly restored to its original out-of-path position, all in definite timed relation to the shuttle movements and other timed movements of the loom parts; thus periodically depositing a uniform light film of oil or other fluid lubricant on the upper part of the spindle from whence it may by gravity and the sliding action of the picker surround the spindle with a film of the lubricant. In carrying out this object various adjustments and relationships of the parts of the improved device are utilized.

2

Another object is to provide a picker spindle oiler which although operated normally under controls which prevent collision with standard moving parts of the loom, has, nevertheless, safety features which will prevent or minimize breakage if normal adjustments are lost or the loom parts may be at times operated in an abnormal manner as during set-up, repair, or when the parts are manually operated following thread breakage or for other reasons.

Still another object lies in the provision of a device for the purposes before stated, which may be made and sold in a simple unit assembly for ready attachment to existing spindle-pick-looms and for quick connection to the standard headmotion devices or harness jacks employed in such looms, so that without rearrangement or discarding of standard parts and in a minimum of time, the picker spindle oiler may be set up in operation.

Other objects and advantages of the invention will be in part obvious and in part particularly pointed out as the following description proceeds.

The invention accordingly consists of the various features of construction, combinations of elements and arrangements of parts which will be exemplified by the description of a preferred form of the invention hereinafter set forth and the scope of the application of which will be indicated in the following claims.

In the accompanying drawings, wherein is shown one of various possible embodiments of the invention:

Fig. 1 is a view in perspective showing the improved picker spindle oiler in its normal out-of-path position on the left side frame of a loom.

Fig. 2 is a view in side elevation of the same with diagrammatic showing of the headmotion vibrator of a loom and the picker spindle. The advanced or oiling position taken by the parts under the influence of the headmotion is shown by the dotted lines.

Fig. 3 is a diagrammatic view of part of the showing in Fig. 2 illustrating the light contact and wiping action of the wick obtained by the present device.

Referring now more particularly to the drawings, a side frame of a common form of loom is shown at 10. The loom is provided with a well-known type of pattern mechanism including a headmotion vibrator of the Knowles type indicated generally at 11. The lay of the loom is indicated at 12 carrying a conventional picker spindle 13 supporting a picker 14 for sliding movement thereon, all in a manner which is common knowledge in the trade and therefore these parts are only diagrammatically or suggestively indicated.

A stud 20 is secured in the side frame 10 with a flange 21 bearing against the outer side surface. An operating arm 22 has a sleeve 23 bored to fit over the stud and against the flange 21. The outer portion of the sleeve is turned down for a length to provide a reduced diameter sleeve 24 over which is fitted a rocker member 25 and the latter is fastened to the sleeve by a set screw or bolt 26 causing it to move rotatively on the stud with the arm 22 whenever the latter is given rotative movement in either direction.

The rocker 25 at its upper region has an extension 27 on which is pivotally mounted a bar 28; the mounting being by a shoulder screw or bolt 30 applied some distance above the lower end of the bar. The rocker is provided at its lower region with an extension 31 which is slotted at 32 for a suitable depth to provide a guide for the bar in any pivotal movement it may have around the pivot screw 30. A flange 33 on the rocker member serves for the attachment of one end of a coil spring 34, the other end of which is fastened to the bar 28 at 35 below the pivot 30 so as to normally hold the lower end of the bar at the closed end of the slot in extension 31. Thus in movement toward and away from the picker spindle, the operating arm, the rocker and the bar all oscillate as a unit around stud 20.

At the upper end of the bar 28 an oiling head 40 is mounted. The head consists of a rectangular metal shell 41 open at the top for the introduction of oil and closed at the bottom by a wick 42 preferably of felt but which may be of other material, substantially drip-proof, or may be a stick or filler of semi-solid lubricant. The wick extends slightly below the shell as shown at 43. Angle pieces 44 have arms 45 secured to a flat wall of the shell or case. The other arms 46 extend to straddle the upper end of the bar 28 and they are secured to the same by a bolt 47 which spaces the shell slightly away from the bar so that angular adjustment of the head can be made to obtain the best control of the application of the lubricant.

A coil spring 50 is attached between the operating arm 22 and the frame to maintain the described rocking assembly normally out of oiling position and out of the path of any moving loom parts, as indicated by the full line showing of Fig. 2. A chain 51 extends oppositely from the arm 22 over idlers 52 on the loom frame to a compound lever 53 pivoted at 54 on the frame. The upper reach of lever 53 has an end 55 extending to the conventional headmotion vibrator 11 including the vibrator gear 56 supported on a lever 57 between two cylinder gears 58 and 60 which operate to drive the gear 56 in one direction or the other accordingly as the lever 57 is raised or lowered by a riser 61 on a pattern chain 62 in use on the loom for effecting harness operation. Obviously, if all harnesses are not in use, which is most always the condition, the connection can be made directly from arm 22 to one of the harness jacks.

The dotted line positions of the parts in Fig. 2 indicate the path taken and the extreme position of the oiling head when lubrication of the picker spindle 13 is initiated.

It will be noted that the oiling head is moved in an arcuate path to impose the wick on the upper surface of the spindle. Continued movement from the headmotion will instantly stress the spring 34 substituting the spring pressure largely for the force of the head mechanism and exerting a slight rocking action on the spindle, resulting in a slight downward wiping action of the oiling head around the spindle. With the present device oiling is not intended on each alternate pick but may take place by a riser engagement every sixteen picks, more or less, according to choice. Thus the application of the lubricant is precisely controlled by the movement of lightweight parts to the heavier mass instead of vice versa, again by the slight spring-pressing action at the area of contact and still further by the lengthening of the time intervals between applications.

While the foregoing deals largely with the association of the improved oiler with textile machinery, it will be obvious that the organization described and the principles involved may have application to other machines.

What is claimed is:

1. A picker spindle oiler for a loom, comprising a mounting stud adapted to be secured to the loom frame, an arm pivotally movable on said stud and having means for connecting it for timed oscillatory movements from standard operating parts of the loom, a bar mounted for oscillatory movement around said stud, an oiling head carried by said bar, a rocker mounted on said stud and serving to mount the bar for an arcuate travel into and out of contact with a picker spindle, spring means between the rocker and the bar adapted to provide a yield of the bar rotatively upon continued movement of the rocker after the oiling head contacts the spindle, and transmission devices for connecting the arm with the headmotion vibrator of the loom for operating according to desired time intervals.

2. A picker spindle oiler for a loom, comprising a mounting stud adapted to be secured to the loom frame, an arm pivotally movable on said stud and having means for connecting it for timed oscillatory movements from standard operating parts of the loom, a bar mounted for oscillatory movement around said stud, an oiling head carried by said bar, a rocker mounted on said stud and serving to mount the bar for an arcuate travel into and out of contact with a picker spindle, spring means between the rocker and the bar yieldable to provide a spring pressure wiping action of the oiling head following initial contact with the spindle, transmission devices for connecting the arm with the headmotion vibrator of the loom for operation according to desired time intervals, and another spring means between the arm and the loom frame yieldingly opposing the arcuate travel of the oiling head toward the picker spindle.

3. In a loom having a frame, a headmotion vibrator, a picker spindle and a picker, a stud secured in said frame, means mounted for rotation on said stud comprising a bar and an oiling head on said bar, connections between said means and said vibrator for rotating said means according to pattern to briefly contact the oiling head with the picker spindle in the normal path of the picker.

4. In a loom having a frame, a headmotion vibrator, a picker spindle and a picker, a stud secured in said frame, means mounted for rotation on said stud comprising a bar and an oiling head on said bar, connections between said means and said vibrator for rotating said means according to pattern to briefly contact the oiling head with the upper surface of the picker spindle in the normal path of the picker.

5. In a loom having a frame, a headmotion vibrator, a picker spindle and a picker, a stud secured in said frame, means mounted for rotation on said stud comprising a bar and an oiling head on said bar, connections between said means and said vibrator for rotating said means according to pattern to briefly contact the oiling head with the picker spindle in the normal path of the picker; said means comprising yieldable connections rendered effective when the oiling head makes a contact during its advancing travel to reduce the contact pressure.

6. In a loom having a frame, a headmotion vibrator, a picker spindle and a picker, a stud secured in said frame, means mounted for rotation on said stud comprising a bar and an oiling head on said bar having an oil box and a depending wick, connections between said means and said vibrator for rotating said means according to pattern to briefly contact the said wick with the picker spindle in the normal path of the picker.

7. In a loom having a frame, a headmotion vibrator, a picker spindle and a picker, a stud secured in said frame, means mounted for rotation on said stud comprising a bar and an oiling head on said bar having an oil box and a depending wick, connections between said means and said vibrator for rotating said means according to pattern to briefly contact the said wick with the upper surface of the picker spindle in the normal path of the picker; said means comprising yieldable connections rendered effective by obstruction to the travel of the oiling head to oiling position.

8. In a loom having a frame, a headmotion vibrator, a picker spindle and a picker, a stud secured in said frame, means mounted for rotation on said stud comprising an operating arm, a rocker member movable with said arm, a bar mounted on said rocker member and relatively rotatably movable therewith, a spring connecting the bar and rocker member to normally move them as a unit and being yieldable in the event of interference, and an oiling head on said bar; connections between said operating arm and said vibrator for rotating said means according to pattern to briefly contact the oiling head with the picker spindle in the normal path of the picker.

9. In a loom having a frame, a picker spindle, a picker, and a pattern mechanism; an oiler for the picker spindle comprising a rocker-assembly mounted for oscillatory movement on the frame and having an oiling head advanceable to the spindle, and means connecting the rocker assembly to the pattern mechanism for operation thereby.

10. In a loom having a frame, a picker spindle, a picker, and a pattern mechanism; an oiler for the picker spindle comprising a rocker-assembly mounted for oscillatory movement on the frame and having an oiling head advanceable to the spindle, means connecting the rocker assembly to the pattern mechanism for operation thereby, and yielding means in the rocker assembly adapted to cause the assembly to advance as a unit toward the spindle under the influence of the pattern mechanism until the oiling head is intercepted in such advance whereupon the yielding means yields to permit continued movement of parts of the rocker assembly without exerting undue pressure on the oiling head at the point of interception.

11. In a loom having a frame, a picker spindle, a picker, and a pattern mechanism; an oiler for the picker spindle comprising a rocker-assembly mounted for oscillatory movement on the frame and having an oiling head advanceable to the upper surface of the spindle, and means connecting the rocker assembly to the pattern mechanism for operation thereby.

12. In a loom having a frame and a movable lay carrying a picker spindle, picker and other parts, a lubricating device for the picker spindle, pivotally mounted on said frame in an out-of-path position with respect to movement of said lay and the parts carried thereby, said lubricating device comprising a rocker body, means for connecting the rocker body for operation by a part of the loom having a timed movement, a bar pivoted on said body, having a lubricating head at its upper end adapted to be advanced by said rocker body into pressure contact with the upper part of said picker spindle, spring means holding the bar to move with said body and yielding upon said pressure contact to permit the bar to move on its pivot and effect a slight downward wiping action of said lubricating head on the spindle.

13. In a loom having a frame and a movable lay carrying a picker, picker spindle and other parts, a lubricating device for the picker spindle comprising a rocking assembly, a stud for mounting the assembly on the loom frame, a sleeve on said stud, means for connecting said sleeve to a part of the loom having a timed operation and to a spring for normally maintaining the rocking assembly out of the path of movement of the lay and parts carried thereby, a body member mounted to move with said sleeve, a lubricating head having a pivotal mounting on said body member, and spring means normally effective to cause movement of said head with said body when the body is moved to advance the head into lubricating contact with the picker spindle and yieldable upon further movement of the body to permit the head to pivot.

14. A lubricating device for the picker spindle of a loom, comprising a stud, means to secure the stud in the loom frame, a sleeve on said stud, an arm extending from said sleeve, a body member movable with said sleeve having an upper arm and a lower slotted arm, a bar pivotally mounted on said upper arm and having its lower end in the slot of the lower arm, a spring having one end attached to said bar between said arms and its other end attached to the body member to stress the lower end of the bar against the body member, a lubricating head at the upper part of the bar, and means for connecting the arm extending from said sleeve to a part of the loom having a timed movement whereby to periodically advance the lubricating head to pressure contact with the picker spindle and thereafter stress said spring to cause the bar to pivot on the body member and slightly wipe the lubricating head transversely of the spindle while in contact therewith.

15. A lubricating device for the picker spindle of a loom, comprising a stud, means to secure the stud in the loom frame, a sleeve on said stud, an arm extending from said sleeve, a body member movable with said sleeve having an upper arm and a lower slotted arm, a bar pivotally mounted on said upper arm and having its lower end in the slot of the lower arm, a spring having one end attached to said bar between said arms and its other end attached to the body member to stress the lower end of the bar against the body member, a lubricating head at the upper part of the bar, means for connecting the arm extending from said sleeve to a part of the loom having a timed movement whereby to periodically advance the lubricating head to pressure contact with the picker spindle and thereafter stress said spring to cause the bar to pivot on the body member and slightly wipe the lubricating head transversely of the spindle while in contact therewith, and spring means for restoring the sleeve to its original position.

OZRO H. CRAM.

REFERENCES CITED

The following references are of record in the file of this patent:

UNITED STATES PATENTS

| Number | Name | Date |
|---|---|---|
| 1,692,968 | Unwin | Nov. 27, 1928 |
| 1,695,386 | Payne | Dec. 18, 1928 |
| 1,724,324 | Turner | Aug. 13, 1929 |
| 2,219,779 | Jennings | Oct. 29, 1940 |

FOREIGN PATENTS

| Number | Country | Date |
|---|---|---|
| 410,632 | France | Mar. 18, 1910 |